they are subsequently converted to water soluble dye derivatives# United States Patent Office 3,320,275
Patented May 16, 1967

3,320,275
WATER SOLUBLE PHTHALOCYANINE DYES
Chi K. Dien and Walter B. Richards, Erie County, N.Y., assignors to Allied Chemical Corporation, New York, N.Y., a corporation of New York
No Drawing. Filed July 29, 1963, Ser. No. 298,441
3 Claims. (Cl. 260—314.5)

This invention relates to novel water soluble dyes and to processes for their manufacture and use. More particularly, it relates to novel dyestuffs prepared by the reaction of halogenomethyl derivatives of water insoluble phthalocyanines with substituted hydrazines.

It is known to prepare quaternary and ternary salt dyestuff derivaties of water insoluble polycyclic aryl compounds by heating a halogenomethyl derivative of the polycyclic aryl compound (1) with a tertiary amine to form a quaternary ammonium salt, (2) with a mercapto derivative and subsequently treating the so-obtained sulphide with an ester known to convert sulphides into ternary sulphonium salts, or (3) with a thiourea containing at least one reactive hydrogen to form an isothiouronium salt. These known derivatives are more water soluble than the polycyclic aryl compounds from which they are derived and as such possess greatly improved substantivity for cellulosic materials, e.g., cotton, paper and the like. In use, under mill conditions, these dyestuffs are somewhat lacking in water solubility and require the solubilizing assistance of surface active agents. The application of dyestuffs of this known class has been accomplished by a rather complicated process involving steaming, chromate fixing, and soaping steps which process offers little if any advantages over the vatting procedure normally used for the application of many of the polycyclic aryl compounds from which these more soluble derivatives are derived. Further, the suggested application method, besides being somewhat arduous, involves considerable expense for specialized equipment. The more recent literature in this field contains numerous suggestions of variations of the general preparative procedure, but so far as we are aware none of the newer derivatives have been entirely successful in overcoming the basic difficulties of this class of dyestuffs.

It is, therefore, a principal object of this invention to devise new and improved water soluble dyes.

A more specific object is to devise novel water-soluble dyes which are reaction products of halogenomethyl-containing phthalocyanines and polyalkylhydrazines and which are easily applicable to cellulosic materials by direct dyeing methods.

Another object is to provide a method of synthesis of these novel water soluble dyes.

Still another object is to provide a method of dyeing cellulosic materials using these novel dyes.

Other objects will be obvious from the following description of our invention.

We have now discovered a new class of water soluble dyestuffs which possess excellent substantivity for cellulosic fibers and which produce dyeings on cellulosic fibers characterized by excellent fastness to light and washing. These new dyes are obtained by heating a halogenomethyl phthalocyanine compound with a polysubstituted hydrazine compound, the latter preferably in excess over the stoichiometric amount, in an organic solvent which does not react with either component under the conditions of the reaction. The reaction is effected at a temperature of at least 50° C. and preferably at 90° to 110° C.

The products of this invention are essentially hydrazonium salts, as represented by general Formula I below. It is theoretically possible, and indeed highly probable, in some instances, for the reaction to proceed along a different course and result in the formation of, as by-product, a substituted hydrazine, II, and/or salt III thereof. The reactions may be represented by the following equations:

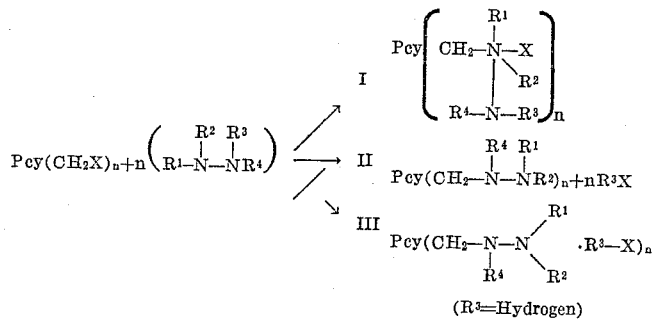

(R³=Hydrogen)

wherein $n$ is at least 1, X is a halogen of the group chlorine and bromine, $R^1$ and $R^2$ are the same or different members of the group consisting of alkyl (e.g. methyl, ethyl, propyl, amyl, octyl, dodecyl) cyclohexyl, aralkyl (e.g. benzyl, p-nitrobenzyl, m-methoxybenzyl, o-chlorobenyl), aryl (phenyl, 2,4-dinitrophenyl, 3-trifluoro-methylphenyl), $R^2$ being other than aryl when $R^1$ is aryl, and $R^3$ and $R^4$ are the same or different members of the group consisting of hydrogen and radicals represented by $R^1$, and Pcy represents a phthalocyanine group.

While the novel dyestuffs of this invention are essentially hydrazonium compounds, they may contain minor amounts of the above mentioned by-products.

The novel products of our invention can be applied to cellulosic fibers in the manner of conventional direct dyestuffs and the dyeings so obtained are fast to light and to washing. The new dyes are particularly useful as colorants for paper, both sized and unsized, the dyeings being further characterized by substantial freedom from "two-sidedness."

Suitable halogenomethyl derivatives of polycyclic aryl compounds for use in this invention include phthalocyanines, both metal free and metal containing, and their derivatives. Representative members of this group of suitable intermediate compounds include the polyhalomethyl derivatives of metal free phthalocyanine
copper phthalocyanine
cobalt phthalocyanine
nickel phthalocyanine
zinc phthalocyanine
iron phthalocyanine
magnesium phthalocyanine
aluminum phthalocyanine as well as the polyhalogenated (e.g., tetrachloro copper phthalocyanine), polyphenyl (e.g., tetraphenyl nickel phthalocyanine), poly sulfamyl (e.g., tetra sulfamyl zinc phthalocyanine) and the like derivatives of this well-known class of organic pigments. The halogenomethyl groups which can be chloromethyl or bromomethyl groups are attached to aromatic ring carbons of the phthalocyanine radical. At least one and as many as eight halogenomethyl groups can be present although phthalocyanines containing from two to five such groups are preferred. Such derivatives which contain at least one and preferably from two to five halogenomethyl moieties per phthalocyanine molecule are desirable starting materials for reaction with polyalkylhydrazines.

The halogenomethyl derivatives can be made by several known procedures. For example, the chloromethyl copper phthalocyanine is conveniently prepared by the action of paraformaldehyde on copper phthalocyanine in a mixture of chlorosulfonic and sulfuric acids at temperatures within the range of 85 to 95° C.

Suitable hydrazines for use in our new process possess at least one nitrogen having two substituents other than hydrogen and may have all hydrogens replaced by alkyl, aryl, or aralkyl substituents. Specific representative examples of such hydrazines include:

1,1-dimethylhydrazine
1,1-diethylhydrazine
1-benzyl-1-methylhydrazine
1-benzyl-1-(m-bromophenyl)hydrazine
1-benzyl-1,2-dimethylhydrazine
1-benzyl-1-(p-methoxyphenyl)hydrazine
1-(4-biphenyl)-1-methylhydrazine
1,1-bis(o-bromobenzyl)hydrazine
1-(2-butoxyphenyl)-1-ethylhydrazine
1-butyl-1-phenylhydrazine
1,1-dibenzylhydrazine
1,2-dibenzyl-1,2-dimethylhydrazine
1,1-dibutylhydrazine
1,1-dicyclohexylhydrazine
1,1-diethyl-2-phenylhydrazine
1,1-dipentylhydrazine
1,2-dimethyl-1-dodecylhydrazine
1(1-naphthyl)-1-methylhydrazine
1,1,2,-tribenzylhydrazine
1,1,2-trimethylhydrazine Toluene is a convenient solvent for use in producing the novel compounds of this invention since it boils, in the presence of the reactants, at a temperature below 110° C. and the reactants are sufficiently soluble and the product is quite insoluble therein. Other suitable solvents which can be used include benzene and xylene.

The reaction is continued for a sufficient period to obtain a substantially complete reaction, i.e., about 10 to 24 hours, after which the product can be separated in any convenient manner as by filtration, evaporation and crystallization, etc. The product is usually obtained in a form sufficiently pure to be used without further purification.

The invention will be illustrated by the following examples. Inasmuch as variations in the details set out in these examples will be obvious to those skilled in this art and such variations can be made without departing from the scope or spirit of our invention, it will be understood that the examples are for illustrative rather than limiting purposes. Parts are by weight and temperatures are given in degrees centigrade.

EXAMPLE I

To about 150 parts of dry toluene, 15 parts tris(chloromethyl) copper phthalocyanine (13.8% Cl) and 7.5 parts of 1,1-dimethylhydrazine are charged. The mixture is heated to boiling under reflux conditions and maintained thereat (T=about 104°) for 18½ hours. The slurry is cooled to about 25° and filtered. The filter cake is washed with about 75 parts of toluene and then with about 120 parts of ethyl alcohol. The washed cake is dried in air. The resultant bright blue powder weighs 18.0 parts and is quite soluble in water. It dyes cotton from a neutral aqueous bath in bright blue shades which possess excellent fastness to washing. Unsized paper is dyed a strong, bright blue shade of excellent fastness to light and freedom from "two sidedness."

EXAMPLE II

The procedure of the above Example I is repeated using 15 parts of tetrakis (chloromethyl) copper phthalocyanine and 9.4 parts of 1,1-dimethylhydrazine in place of the tris (chloromethyl) copper phthalocyanine and 7.5 parts of 1,1-dimethylhydrazine. The resulting product is a bright blue powder which dyes cellulosic materials in washfast blue shades which are somewhat greener than the product of Example I. The product of this example is somewhat more soluble in water than the dyestuff of Example I.

EXAMPLE III

A mixture of 50 parts of 100% sulfuric acid and 300 parts of chlorosulfonic acid is cooled to below 30° and then 30 parts of zinc phthalocyanine are added. The mixture is agitated for about ½-hour and while maintaining the temperature below 30°, 100 parts of paraformaldehyde are added. The mixture is agitated at about 25° for ½-hour while excluding atmospheric moisture, and then it is heated, over about two hours, to and maintained at 94° to 96° for 6½ hours. The mass is cooled to about 25° and then drowned in 2000 parts of ice and water. The aqueous mass is diluted to about 4000 parts water metric volume with cold water and the resultant slurry is filtered. The filter cake is washed well with cold water and then with ethyl alcohol. The wash cake is dried at 65° to 70°. The product is a blue green solid, weighing 48.5 parts and containing 16.7% chlorine. Inasmuch as tris (chloromethyl) zinc phthalocyanine contains 14.95% Cl while the tetrakis chloromethyl derivative contains 18.40% Cl, the product prepared herein is apparently a mixture of the two.

A mixture of 15 parts of the above prepared tris/tetrakis (chloromethyl) zinc phthalocyanine and 8.6 parts of 1,1-dimethylhydrazine in 150 parts of dry toluene is heated to boiling and refluxed at about 102° for about 17 hours. The mixture is cooled to about 25°, diluted with about 80 parts of acetone and the slurry is filtered. The filter cake is washed with aqueous acetone until the wash liquor is practically colorless. The washed cake is dried in air. The resultant product dyes paper, both sized and unsized, directly in strong yellow-green shades of excellent fastness to light.

EXAMPLE IV

A solution of one part of the product of Example I above in 125 parts of boiling water is diluted with 250 parts of distilled water and 50 parts of 20% aqueous solution of sodium chloride. A 20 part skein of cotton yarn is entered into the dyebath which is gradually raised to the boil and maintained thereat for one hour while intermittently working the skein in the dyebath. Thereafter, the dyed skein is removed from the dyebath, rinsed thoroughly in warm water then in cold water and dried. The resultant skein is dyed a deep greenish blue shade of excellent levelness and freedom from speckiness.

From the foregoing description of our invention and the detailed examples illustrating several specific practical manifestations thereof, it will be apparent that a new class of water soluble direct dyes for cellulosic fibers characterized by excellent fastness properties has been devised.

It will be appreciated that the foregoing examples are illustrative and that many variations in the specific details set out therein can be employed without departing from the spirit of the invention.

We claim:
1. A novel water soluble compound having substan- tivity for cellulosic materials and having the general formula

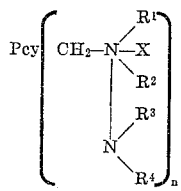

wherein $n$ stands for an integer 1 to 8;
X is chlorine or bromine;
$R^1$ and $R^2$ are the same or different radicals of the group consisting of alkyl containing 1 to 12 carbon atoms, cyclohexyl, benzyl, nitrobenzyl, methoxy benzyl and chlorobenzyl, phenyl, 2,4-dinitrophenyl and 3-trifluoromethylphenyl, provided that when $R^1$ is aryl $R^2$ is alkyl or aralkyl;
$R^3$ and $R^4$ are the same or different members of the group consisting of hydrogen and radicals represented by $R^1$;
Pcy represents a metal free or metal containing phthalocyanine group or metal free or metal containing polychloro, tetraphenyl, or tetrasulfamyl phthalocyanine group;
and wherein the methylene group is attached to an aryl nucleus of the phthalocyanine group.

2. The compound of claim 1 wherein $n$ is 2 to 5 and $R^1$ and $R^2$ are lower alkyl.

3. The compound of claim 2 wherein $R^1$ and $R^2$ are methyl, $R^3$ and $R^4$ are hydrogen and X is chlorine.

References Cited by the Examiner
UNITED STATES PATENTS

| | | | |
|---|---|---|---|
| 2,542,327 | 2/1951 | Haddock et al. | 260—314.5 |
| 3,057,873 | 10/1962 | Pugin et al. | 260—314.5 |
| 3,063,780 | 11/1962 | Rosch et al. | 8—1 |
| 3,143,574 | 8/1964 | Brown | 260—608 |
| 3,190,871 | 6/1965 | Auerback et al. | 260—146 |

WALTER A. MODANCE, *Primary Examiner.*
JAMES A. PATTEN, *Assistant Examiner.*